UNITED STATES PATENT OFFICE.

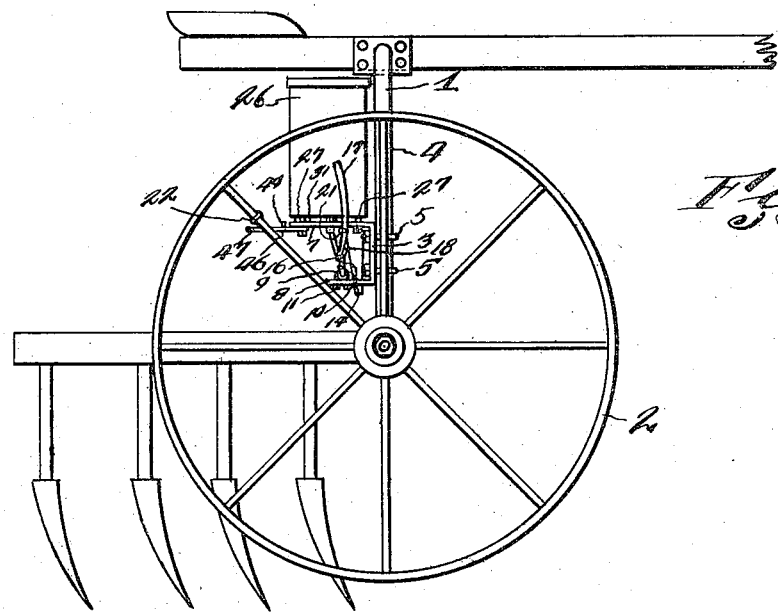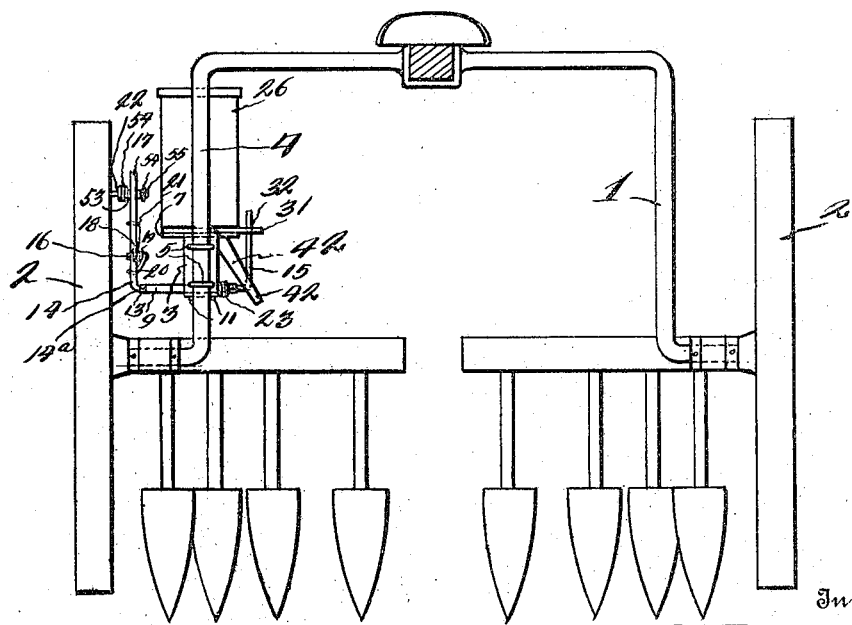

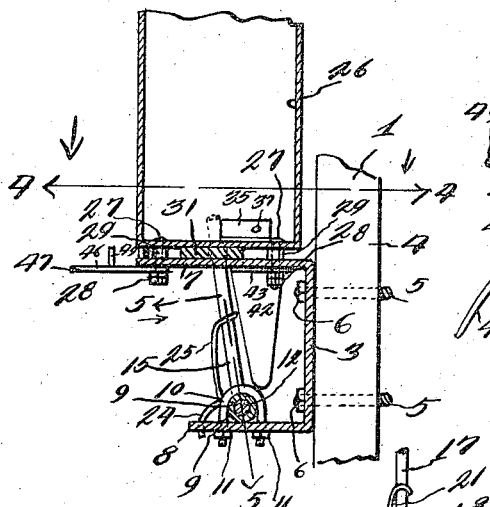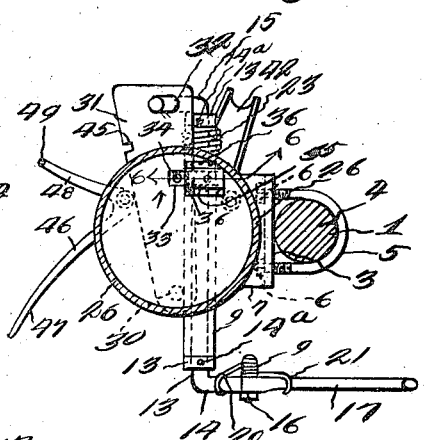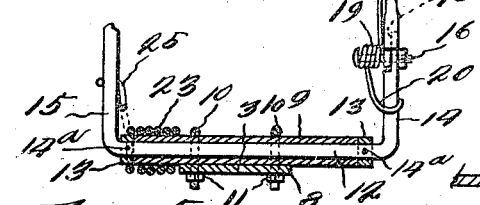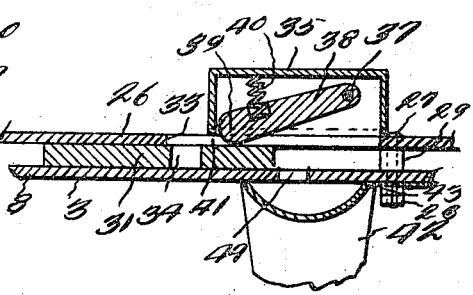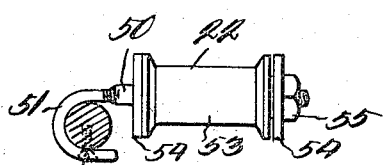

MAT P. JOHNSON, OF CHICO, TEXAS.

DROP-FEED FOR SEEDERS AND PLANTERS.

1,241,123.  Specification of Letters Patent.  Patented Sept. 25, 1917.

Application filed November 15, 1916, Serial No. 131,522. Renewed August 15, 1917. Serial No. 186,422.

*To all whom it may concern:*

Be it known that I, MAT P. JOHNSON, a citizen of the United States, residing at Chico, in the county of Wise, State of Texas, have invented a new and useful Drop-Feed for Seeders and Planters; and I do hereby declare the following to be a full, clear, and exact description of the invention, such as will enable others skilled in the art to which it appertains to make and use the same.

This invention relates to the art of seeders and planters, and more particularly to an improved drop feed for such machines, whereby seed of any kind, preferably peas, may be planted.

One of the objects of the invention is to provide a seed receptacle, which is provided with an opening or aperture in the bottom, there being a pivoted member having a corresponding aperture, and designed to be intermittently actuated or tripped so as to cause the aperture of said member to register with the aperture of the seed receptacle.

A further object of the invention is to provide a rocking element having arms at its ends, one to loosely engage said pivoted member, the other to be engaged by a member on one of the supporting wheels of the planter, whereby said element is intermittently rocked, so as to in turn actuate the pivoted member.

Another object of the invention is to provide one of the arms of said elements with a pivoted finger, which is yieldable rearwardly, so that should the planter be moved backwardly, the member on the wheel will trip the finger idly.

Another object of the invention is to provide means to guard and prevent the pivoted member of the seed receptacle from binding, and peas getting under the guard.

A further object of the invention is to provide means for holding the pivoted feed member out of operation, so that one of the arms of said element cannot be engaged by the member on the wheel of the planter.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in side elevation of a portion of a planter frame, showing the improved drop feed mechanism as applied to the seed box or receptacle.

Fig. 2 is a view in front elevation.

Fig. 3 is an enlarged detail sectional view of the drop feed mechanism and the seed receptacle supported upon one of the sides of the arch axle of the planter.

Fig. 4 is a sectional view on line 4—4 of Fig. 3.

Fig. 5 is a sectional view on line 5—5 of Fig. 3.

Fig. 6 is a sectional view on line 6—6 of Fig. 4.

Fig. 7 is a detail sectional view, partly in elevation of the device or member carried on one of the spokes of one of the wheels of the planter, for actuating said drop feed mechanism.

Fig. 8 is a sectional view on line 8—8 of Fig. 7, showing parts in plan view.

Referring more especially to the drawings, 1 designates the arch axle of the planter, which may be any suitable or conventional form, and mounted upon the ends of the axle are the supporting wheels 2. It is to be understood that the drop feed mechanism may be applied to each side of the axle or frame of the machine, but in the present instance only one is illustrated and described. Therefore, a bracket 3 is arranged adjacent an upright side portion of said arch axle, there being staples 5 arching the upright 4 and passing through the vertical portion of the bracket and provided with nuts 6, to hold the bracket in place. The bracket 3 is provided with the upper and lower laterally extending horizontal portions 7 and 8. A sleeve 9 is arranged on the lower laterally extending horizontal portion 8, there being staples 10 arching the sleeve and passing through the portion 8 and provided with nuts 11, to hold the staples and the sleeve in position. Mounted in the sleeve is a rocking shaft or member 12, there being collars 13 pinned upon the shaft by the pins 14ª to prevent axial movement of the shaft. The opposite ends of the shaft terminate in substantially upwardly extending arms 14 and 15. The arm 14 has pivoted to it by means of a bolt 16 an extension 17. The extension, where it is pivoted to the arm 14, overlaps said arm, the extremity of which has a lug 18, against which the extension abuts, so as to move with the arm 14 and rock the shaft 12, when a member on one of the wheels 2 engages said extension. A coil spring 19 is carried by the bolt 16, and has one end portion 20 engaging the arm 14 and the other end portion 21 engaging the extension, to hold the same in contact with the lug 18. It is to be noted that when the wheel 2 (which carries the tripping member 22) rotates backwardly, the tripping member 22 will idly trip the extension 17, while the spring 19 will return it to its initial position in contact with the lug 18. A coil spring 23 is mounted upon one end of the sleeve 9, and has one end 24 engaging through the portion 8 of the bracket 3, while its other end 25 engages the arm 15 of the shaft 12. However, when the planter is moving forwardly and the tripping member engages the extension 17 of the arm 14, the shaft or element 12 will rock in its sleeve bearing against the action of the spring 23. A seed receptacle 26 is secured on the lateral portion 7 of the bracket 3, by means of the bolts 27 and the nuts 28, there being collars 29 on the said bolts, to hold the receptacle 26 spaced on and from the part 7 of said bracket. Pivoted by means of a suitable pin 30 on the portion 7 of said bracket 3 is a triangular drop feed plate 31, which is between the portion 7 and the bottom of the receptacle 26. The free end portion of this plate 31 has an aperture 32, which loosely receives the end portion of the arm 15 of the rocking shaft or element 12. The bottom of the seed receptacle toward one side has an elongated slot 33, with one end of which an aperture 34 of the plate 31 normally registers. An arch casing 35 has its lateral flanges secured by the bolts or rivets or the like 36 to the bottom of the receptacle 26, so that said casing will arch the greater portion of the slot 33. Pivoted in the casing 35 upon the pin 37 is a guard 38, the free end portion 39 of which is held in engagement with the plate 31 by means of the coil spring 40, so that said free end portion 39 will prevent any peas or seed from entering the casing 35, between one end of the casing and said plate 31, as shown at 41. A seed chute 42 having a lateral flange 43 is provided, and it is to be noted that one of the bolts 27 passes through the flange 43, to hold the chute suspended from the under portion of the part 7 of said bracket 3. This chute 42 extends downwardly and inwardly, and its upper end is in registration with an opening or aperture 44 of the part 7 of said bracket 3. As the wheels of the planter rotate, the tripping member 22 on one of said wheels will intermittently engage the extension 17 of the arm 14, and rock the shaft or element 12 against the action of its spring 23, so that the arm 15 will oscillate the plate 31, the aperture 34 of which having received a seed or pea, and when the aperture 34 registers with the aperture 44, the seed or pea will drop through the chute to the ground, where it is covered by the usual teeth of the planter. As soon as the tripping device 22 passes the extension 17, the plate 31 will return to its initial position shown in Fig. 4, by the action of the spring 23. The plate 31 in one edge has a notch 45. Pivoted upon one of the bolts 27 is an angular lever 46, one arm of which constitutes a handle 47, while the other arm 48 has an upstanding lug 49. To throw the plate 31 out of operation, the handle 47 of said lever 46 is grasped manually, then operated, so that the upstanding lug 49 will ride against one edge of the plate 31, moving the plate until the aperture 34 is under the casing 35 and the lug 49 engages the notch 45. In this case the rock shaft or element 12 will have been rocked sufficiently against the action of its spring 23, as to dispose the extension 17 of the arm 14 out of the path of the tripping member 22, thereby preventing the drop feed mechanism from operating. The trip member 22 consists of an arm 50 having its hooked end 51 secured by a screw 52 on one of the spokes of one of the wheels 2, and mounted upon the arm 50 is a spool or roller 53, there being washers 54 and a nut 55 to prevent excessive axial movement of the spool or roller. This spool or roller has an interior bushing 56, to prevent wear on the roller.

The invention having been set forth, what is claimed as new and useful is:—

In combination with a planter, a seed receptacle having its bottom provided with a slot, a supporting bracket upon the frame of the planter for said receptacle, said bracket having an aperture registering with one end of said slot, a plate pivoted on the bracket between the bracket and the bottom of the receptacle and provided with an aperture to normally register with the other end of said slot, and means actuated intermittently by a member on one of the wheels of the planter to actuate said plate intermittently, whereby its aperture will intermittently register with the aperture of the bracket, to feed seed one at a time from the receptacle, and a casing arching the greater portion of the slot, to prevent the seed from entering the aperture of the bracket until the aperture of the plate registers with the aperture of the bracket, and a guard pivoted in said casing and provided with a spring to hold it in engagement with said plate, to prevent the seed from entering the casing at one end when the plate is actuated, means for returning the first means and said plate to their initial positions, and
5 means for throwing the plate and its actuating means out of operation.

In testimony whereof I have signed my name to this specification in the presence of two subscribing witnesses.

MAT P. JOHNSON.

Witnesses:
R. L. MORRIS,
H. C. T. ROBINSON.

Copies of this patent may be obtained for five cents each, by addressing the "Commissioner of Patents, Washington, D. C."